United States Patent [19]

Stover et al.

[11] Patent Number: 5,416,590
[45] Date of Patent: May 16, 1995

[54] APPARATUS AND PROCESS FOR MEASURING GAP AND MISMATCH

[75] Inventors: John C. Stover; Donald R. Bjork; Donald A. Rudberg; Mark E. Southwood; Brett D. Swimley, all of Bozeman, Mont.

[73] Assignee: TMA Technologies, Inc., Bozeman, Mont.

[21] Appl. No.: 49,478

[22] Filed: Apr. 19, 1993

[51] Int. Cl.⁶ .................................................. G01B 11/14
[52] U.S. Cl. ..................................... 356/375; 356/376
[58] Field of Search ............... 356/372, 375, 376, 377, 356/384, 387, 445, 446, 237, 1, 4; 358/101, 107; 250/560, 561, 562

[56] References Cited

U.S. PATENT DOCUMENTS

| | | | |
|---|---|---|---|
| 3,976,382 | 8/1976 | Westby | 356/376 |
| 4,105,925 | 8/1978 | Rossol et al. | 356/376 |
| 4,162,126 | 7/1979 | Nakagawa et al. | 356/237 |
| 4,498,776 | 2/1985 | Smith | 356/375 |
| 4,541,721 | 9/1985 | Dewar | 356/375 |
| 4,629,319 | 12/1986 | Clarke et al. | 356/237 |
| 4,666,303 | 5/1987 | Pryor | 356/375 |
| 4,837,615 | 6/1989 | Boshier | 358/100 |
| 4,920,385 | 4/1990 | Clarke et al. | 356/237 |
| 4,988,204 | 1/1991 | Sakaguchi et al. | 356/430 |
| 5,103,412 | 4/1992 | Ueda et al. | 364/563 |
| 5,129,010 | 7/1992 | Higuchi et al. | 356/376 |
| 5,245,409 | 9/1993 | Tobar | 356/375 |

*Primary Examiner*—Hoa Q. Pham
*Attorney, Agent, or Firm*—Madson & Metcalf

[57] ABSTRACT

A hand-held apparatus and process for measuring the gap and mismatch of two adjacent surfaces. The apparatus includes two strobe lights positioned within a hand-held housing. An optical interface within the housing directs a portion of the light generated by each light source into substantially parallel planes which are projected out of the opening of the housing at converging angles onto the surfaces to be measured. A camera within the housing captures the resulting image and generates a signal corresponding to the image. A signal processor which includes a frame grabber card processes the signal generated by the array of detectors to thereby calculate the amount of gap and mismatch between the surfaces being measured.

36 Claims, 7 Drawing Sheets

APPARATUS AND PROCESS FOR MEASURING GAP AND MISMATCH

BACKGROUND

1. The Field of the Invention

The present invention is related to an apparatus and process for measuring the gap and mismatch of two adjacent surfaces. More particularly, the present invention is related to an apparatus and process for projecting two planes of light on adjacent surfaces and capturing and analyzing the resulting images to thereby calculate the gap and mismatch.

2. Technical Background

One step in the manufacture of automobiles and airplanes is the installation of body panels. Body panels are designed to simulate a continuous skin or covering about the vehicle. Body panels may be used to enhance the aerodynamic characteristics of the vehicle as well as provide the vehicle with an aesthetically pleasing shape.

The aesthetic and aerodynamic properties of a body are generally improved by ensuring that the distance between adjacent body panels is consistent and that the surfaces of adjacent panels follow the same contour. These qualities are generally quantified as the "gap" and "mismatch" of two adjacent surfaces. Thus, as used herein, the term "gap" refers to the end-to-end separation of two adjacent surfaces, as measured in the plane of one of the surfaces. The term "mismatch" means the surface-to-surface separation of two adjacent surfaces as measured in the direction perpendicular to the plane of one of the surfaces.

Thus, the quality of fit of two adjacent surfaces may be quantified and analyzed by measuring the gap and mismatch at several locations along the border of the surfaces. One of the most common methods for measuring gap is to employ an inside caliper or micrometer. Such an instrument includes jaws which are inserted into the gap and expanded until each comes into contact with the surface defining the gap. The size of the gap can then be read off marks on the instrument which measure the amount of extension of the jaws.

For applications requiring tight tolerances, this manual method for measuring gap is disadvantageous because of its limited accuracy. The operator of the instrument must ensure that the caliper is inserted in precise perpendicular orientation to the length of the gap. Additionally, because the jaws must contact the surfaces, there exists the possibility that the surfaces may deflect slightly upon contact, thereby providing a false reading.

Measuring mismatch is even more difficult and less precise. Typical prior art methods for measuring mismatch involve placing a straight edge along one surface such that it extends across the gap. An inside caliper or micrometer may then be employed to measure the distance between the second surface and the extended straight edge.

Of course, the accuracy of such a process depends greatly on the ability to accurately lay the straight edge along one of the surfaces. If, for example, the surfaces are curved, it may be impossible to accurately measure mismatch using this method.

In many circumstances it is desirable to keep a record of the gap and mismatch of body panels at various predetermined points. When utilizing the prior art methods described above, this data is generally manually recorded. Of course, when data is manually recorded there exists the possibility of human error resulting in inaccurate data being recorded.

In addition to the inherent limitations of accuracy, another significant disadvantage of using the manual processes described above to measure gap and mismatch is the amount of time required to take the measurements. To measure gap and mismatch at a single location, gap and mismatch must be independently measured and recorded before moving to measure the next location. As a result, thorough quantitative inspections of body panels are prohibitively expensive to perform in many applications.

From the foregoing, it will be appreciated that it would be an advancement in the art to provide an improved apparatus and process for measuring gap and mismatch. Indeed, it would be an advancement in the art if such an apparatus and process provided increased accuracy over existing manual methods, thereby enabling tighter tolerances to be achieved in the fitting of body panels.

It would be an additional advancement in the art if such an apparatus and process for measuring gap and mismatch could automatically record data, thereby eliminating the possibility of human error in the recordation of data.

It would be a further advancement in the art if such an improved apparatus and process could be utilized to quickly measure gap and mismatch at a variety of locations, thereby rendering quantitative inspections of body panels economically viable and enabling superior fit of body panels to be achieved.

Such a method and apparatus is disclosed and claimed herein.

BRIEF SUMMARY AND OBJECTS OF THE INVENTION

The present invention is directed to a novel apparatus and process for measuring gap and mismatch of two adjacent surfaces. In one embodiment, the apparatus of the present invention is a hand-held measurement head which includes a housing and a handle attached to the housing for gripping the device. Within the housing are mounted two strobe lights which are positioned on opposite sides of the housing.

An optical interface is positioned in combination with the strobe lights to direct the light into two planes. The optical interface includes an aperture and a cylindrical lens in combination with each strobe light. The resulting plane of light from each strobe is directed onto mirrors positioned near the opening of the housing such that the beams of light are directed out of the opening at an incident angle of approximately 45 degrees with respect to the plane of the opening. The mirrors are positioned such that the planes of light converge to a line of intersection at a point beyond the opening of the housing.

A camera is mounted within the housing such that the field of view of the camera includes portions of interest within the opening of the housing. The camera includes an array of detectors, with each detector capable of detecting the intensity of light and of generating a signal corresponding to the detected intensity. A lens on the camera is configured to focus an image onto the array of detectors.

The hand-held measurement head is electrically connected to a computer which is configured with a frame grabber card such that signals generated by the array of detectors may be processed by the computer.

To measure the gap and mismatch of two adjacent surfaces, such as body panels, the hand-held device is placed against the border of the surfaces such that the gap may be viewed by the camera through the opening in the housing. Fiducial marks on the housing assist the user in properly aligning the measurement head with respect to the gap. A trigger on the measurement head may be depressed by the user to flash the strobe lights. Upon actuation of the strobe lights, two planes of light are projected on the surfaces to create two curvilinear images on the surfaces. As used herein, "curvilinear" includes any combination of linear or curved line segments, whether continuous or discontinuous. Because the surfaces are discontinuous at the gap, the curvilinear images are correspondingly discontinuous at that location.

The camera lens focuses the curvilinear images onto the array of detectors within the camera. Each detector generates a signal corresponding to the magnitude of the intensity of light it detects. The signals from the array of detectors are transmitted to the computer where the frame grabber card enables the signals to be quickly recorded.

The computer analyzes the maximum and minimum signal from the array and calculates a set of threshold values, one for each column of detectors, above which each detector, or pixel, is assigned an "ON" value. Those falling below the threshold value are assigned an "OFF" value.

The computer then simultaneously calculates the gap and mismatch by identifying the three-dimensional position of the planes corresponding to the surfaces from which gap and mismatch are to be measured and identifying the three-dimensional location of the edge of each surface at the gap.

Once determined, the values of gap and mismatch are displayed on a display located on the measuring head. If desired, predetermined tolerances may be entered into the computer against which the measured values of gap and mismatch may be compared. If the measured values fall outside of the tolerances, an "OUT OF TOLERANCE" light on the measurement head will illuminate.

The measured gap and mismatch are typically automatically recorded by the computer, thereby providing a permanent record of each measurement taken by the device.

For applications where it is desirable to measure several predetermined locations, a second trigger is included on the measurement head. Depressing the second trigger records the most recent measurement in the computer and indicates to the computer that the user is advancing to the next location. Thus, several measurements may be taken at a single location before proceeding to the next location.

It is, therefore, an object of the present invention to provide an improved apparatus and process for measuring gap and mismatch which provides increased accuracy over existing manual methods, thereby enabling tighter tolerances to be achieved in the fitting of body panels.

It is a further object of the present invention to provide such an apparatus and process for measuring gap and mismatch which automatically records data, thereby eliminating the possibility of human error in the recordation of data.

It is an additional object of the present invention to provide such an apparatus and process which may be utilized to quickly measure gap and mismatch at a variety of locations, thereby rendering quantitative inspections of body panels economically viable and enabling superior fit of body panels to be achieved.

These and other objects and advantages of the present invention will become more fully apparent by examination of the following description of the preferred embodiments and the accompanying drawings.

BRIEF DESCRIPTION OF THE DRAWINGS

In order that the manner in which the above-recited and other advantages and objects of the invention are obtained, a more particular description of the invention briefly described above will be rendered by reference to the appended drawings. Understanding that these drawings only provide data concerning typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
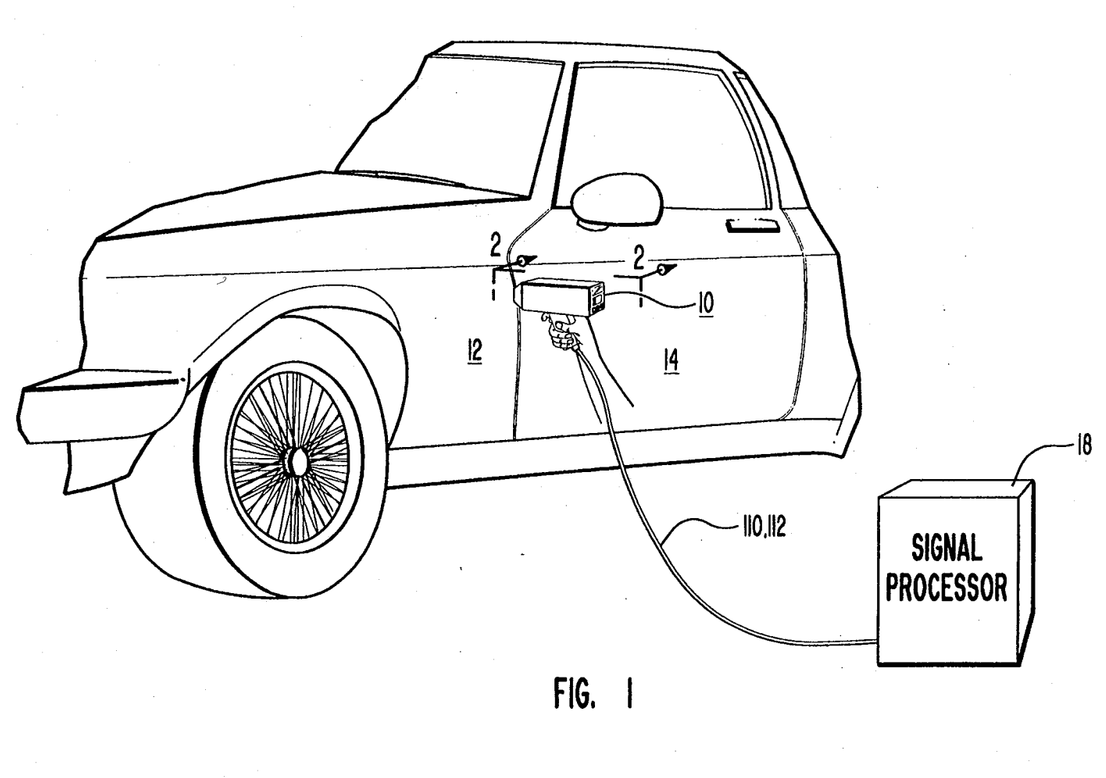
FIG. 1 is a perspective view of one embodiment of the measurement head of the present invention as it is being used to measure gap and mismatch of two adjacent panels on an automobile.

Reference is now made to the figures wherein like parts are referred to by like numerals throughout. With particular reference to FIG. 1, an apparatus for measuring gap and mismatch according to the present invention is generally designated at 10. The apparatus 10 is positioned for measurement of the gap and mismatch of two adjacent surfaces, a left surface 12 and a right surface 14.

Figure 2:
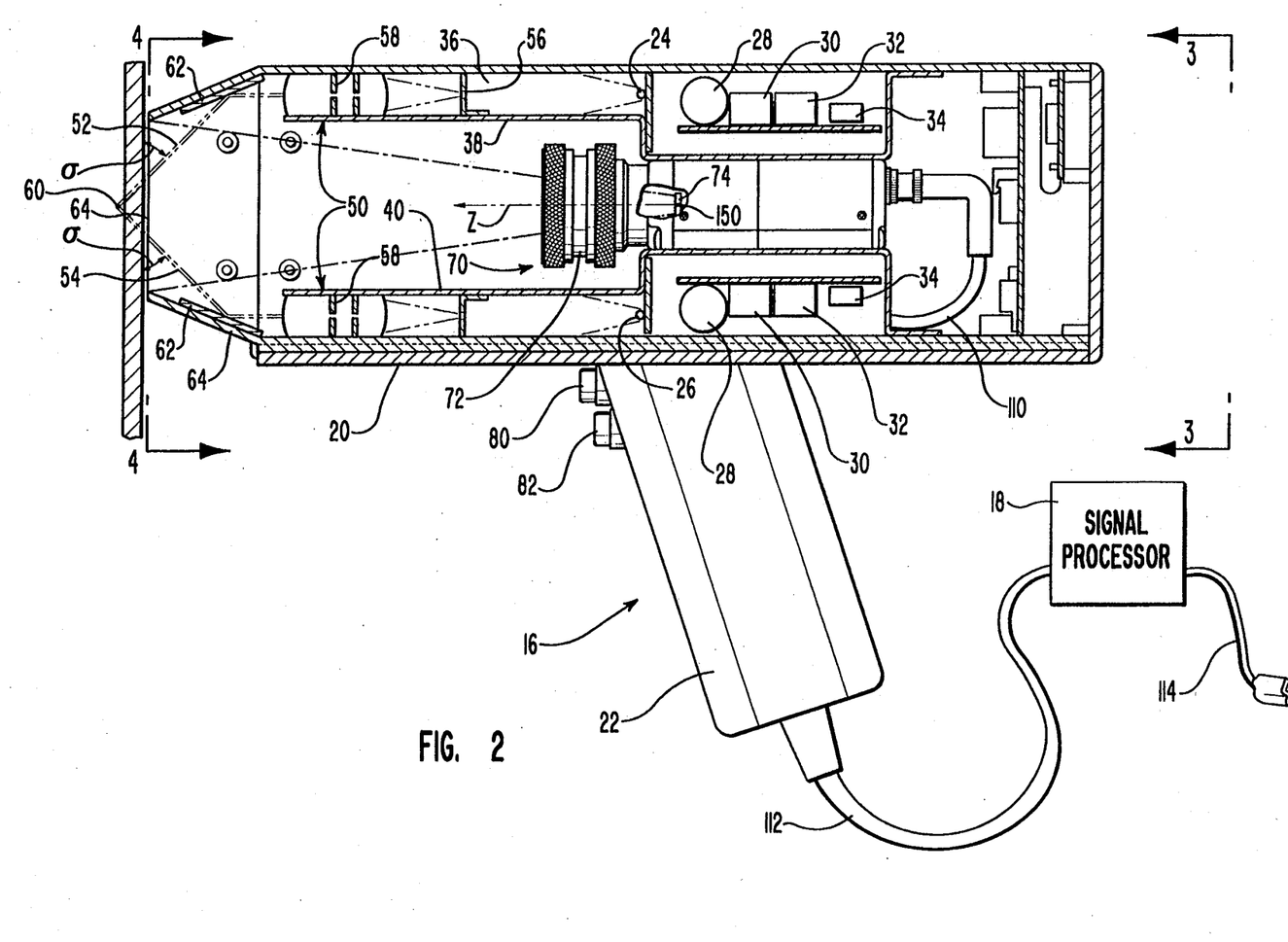
FIG. 2 is a cross-sectional view taken along line 2—2 of FIG. 1.

As illustrated in FIG. 2, the apparatus 10 of the present invention includes a measurement head 16 and a signal processor 18. The measurement head 16 includes a housing 20 to which is attached a handle 22 by which a user may hold the instrument and position it for measuring gap and mismatch.

Within the housing 20 are mounted two light sources 24 and 26. In a presently preferred embodiment of the invention, the light sources 24 and 26 are strobe lights because they have been found to provide a good signal-to-noise ratio. However, one of skill in the art will appreciate that the present invention may be readily configured to utilize a variety of types of light sources, including a flash lamp or continuous running lights such as lasers. It is presently preferred to utilize a strobe tube with a diameter of approximately 3.5 mm and a length of approximately 32 mm. The strobe tubes are oriented horizontally within the housing 20.

Each light source 24 and 26 includes a capacitor 28 for building a charge, a trigger transformer 30 for relaying the signal to actuate the strobe tube, a DC to DC converter 32 to obtain the high voltage necessary to flash the strobe and an interface 34 that sends the pulse to the trigger transformer 30.

Each light source 24 and 26 is enclosed in a light channel 36 formed by light barriers 38 and 40. Barriers 38 and 40 ensure that the light generated by the light sources 24 and 26 is maintained within the channels 36 thereby preventing the portion of the housing outside the channels 36 from being exposed to stray light from the light sources.

An optical interface 50 is provided in combination with each light source 24 and 26. Each optical interface is configured to receive light from the light source and to project a plurality of beams of light within a plane of known position, as will be explained below in greater detail. These beams of light are projected onto the surfaces to produce images on the surfaces.

In a presently preferred embodiment, the optical interfaces are configured to receive light from each light source 24 and 26 and generate a first plane of light 52 corresponding to the first light source 24 and a second plane of light 54 corresponding to the second light source 26. As explained in greater detail below, each plane of light 52 and 54 is directed towards the surfaces 12 and 14 at an approximate angle of incidence $\sigma$ of from about 40 to about 50 degrees. It is presently preferred that the angle of incidence $\sigma$ be approximately 45 degrees.

The optical interfaces 50 each include apertured lenses configured to receive the light emitted from the light source and direct a portion of the received light into a plane. In a presently preferred embodiment, the apertured lenses comprise an aperture 56 and a long-focus cylindrical lens 58. The aperture 56 is a piece of opaque material configured with a horizontal slot through which light from the light sources 24 and 26 is generally directed into a plane. The cylindrical lens 58 is preferably a 3221.01 lens made by FOSTEC of Auburn, N.Y.

A typical cylindrical lens 58 includes two oppositely oriented lenses having two apertures positioned between the lenses. So configured, each cylindrical lens 58 focuses the rough plane formed by the aperture 56 into a plane of light. The lenses 58 are preferably configured to focus the planes of light at the opening 64 of the housing.

Directing mirrors 62 are positioned in the neck 64 of the measurement head such that the planes of light 52 and 54 are reflected out of the housing 20 through an opening 66. The mirrors 62 are also preferably configured such that the point of intersection 60 of the planes of light occurs beyond the opening 66.

A camera 70 is positioned within the housing 20. The camera 70 includes a lens 72 and an array of detectors 74 and produces a standard RS170 signal. Camera 70 is preferably a high resolution, charged coupled device (CCD) camera such as the KP-M1 camera made by Hitachi Denshi, Ltd. of Woodbury, N.Y. One of skill in the art will appreciate that virtually any type of camera capable of detecting intensity of light and of generating a signal corresponding to the detected intensity may be effectively employed, such as a charge injection device camera. In the presently preferred embodiment of the invention, the array 74 within camera 70 includes a 768 (horizontal) by 493 (vertical) array of active detectors. Each detector produces a signal from 0 to 255 counts, proportional to the intensity of light detected by the detector. Alternatively, any camera capable of capturing the images and producing a corresponding signal which may be analyzed as described herein may be utilized in accordance with the teachings of the present invention.

The camera 70 and lens 72 are preferably positioned within the housing 20 such that the images generated on the surfaces lie substantially within the field of view of the camera. The lens 72 is configured such that an image positioned contiguous to opening 64 of the housing is focused on the array 74.

The measurement head 16 also includes two control buttons, an advance button 80 and a measurement button 82. The control buttons 80 and 82 are preferably positioned at the top of the forward side of the handle 22, as illustrated in FIG. 2. So positioned, they may be easily actuated by the index finger of a user operating the measurement head.

Figure 3:
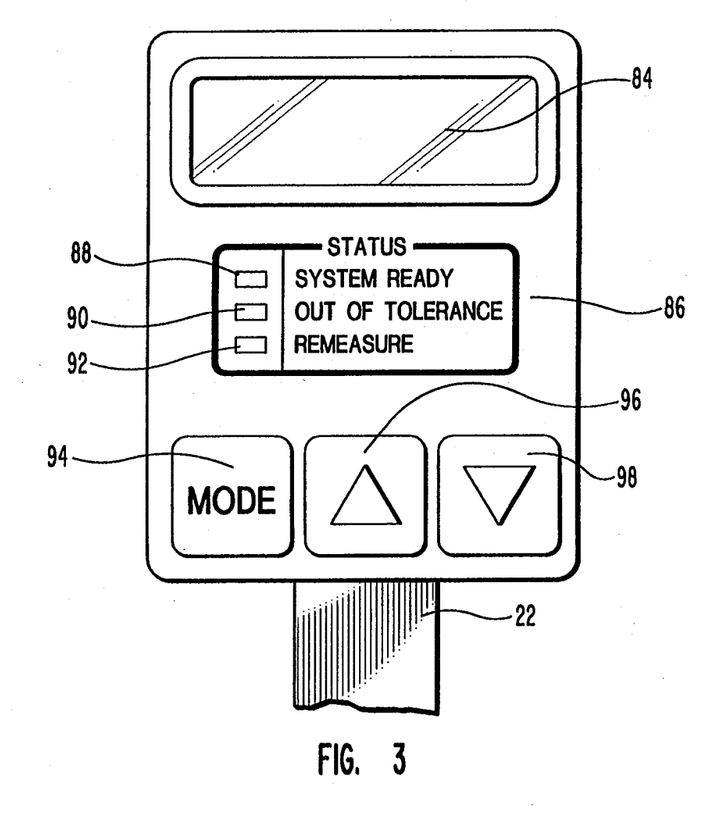
FIG. 3 is a plan view taken along line 3—3 of FIG. 2.

As illustrated in FIG. 3, the measurement head also includes a display 84 on which values for gap and mismatch may be displayed for immediate access by the user and a control panel 86. One currently preferred display 84 is a two-line, back lit LCD display. Additionally, the path and file name for data storage may also be displayed on display 84.

The control panel 86 of the presently preferred embodiment of the invention includes three indicator lights; a green "SYSTEM READY" light 88, a yellow "OUT OF TOLERANCE" light 90 and a red "REMEASURE" light 92. The control panel 86 also includes a "MODE" button 94, an "UP" arrow 96 and a "DOWN" arrow 98. In one mode, selected by depressing the MODE button 94, the UP and DOWN arrows 94 and 96 may be used to toggle between gap and mismatch data and the path and file name which are being used by the computer for storage and retrieval of data. In another mode, the UP and DOWN arrows 94 and 96 are used to adjust the amount of back light on the display 84. A third mode may be used to select which edges of the gap are to be determined, in the case of gaps having multiple edges. As will be appreciated by one of skill in the art, a variety of displays and control panels may be incorporated on the measurement head to display various information and obtain user input according to the particular application for which the device is being used.

With reference again to FIG. 2, the signal processor 18 is preferably an IBM compatible computer with at least an Intel ® 80386 processor or higher and having at least four megabytes of random access memory and at least a 40 megabyte hard drive. A color monitor is preferably included which has VGA or higher resolution graphics capabilities. In a presently preferred embodiment, the computer operates in a Windows version 3.1 operating system.

Importantly, a "frame grabber" card, such as the DT2853-SQ card available from Data Translation of Marlboro, Mass., is installed in the computer. While a variety of sizes of pixel arrays within the frame grabber may be employed, the presently preferred frame grabber has a pixel array of 512 (horizontal) by 480 (vertical). The frame grabber card enables the computer to read the RS170 signal from the camera 70 in approximately 0.03 seconds. Once the data points are recorded on the frame grabber, the computer can then analyze the data without having to read any further data from the array.

The data from the array is transmitted to the frame grabber card through a coaxial cable 110 which extends from the camera 70 through the handle 22 and through a line 112 to the signal processor 18. An RS232 cable, also included in line 112, communicates data from the signal processor 18 to and from the display 84 and control panel 86. Additionally, a power supply cord 114 connects into a 110 Volt, 60 Hz. power source which supplies power to the measurement head 16 through line 112.

One of skill in the art will appreciate that the apparatus of the present invention may be configured with the computer and power source carried on a belt pack, thereby rendering the apparatus even more portable than presently configured. Additionally, as technological advances in electronics render the electronic components of the present invention lighter and more compact, it may eventually be possible to include all of the components of the apparatus of the present invention within the measurement head 16.

Figure 5:
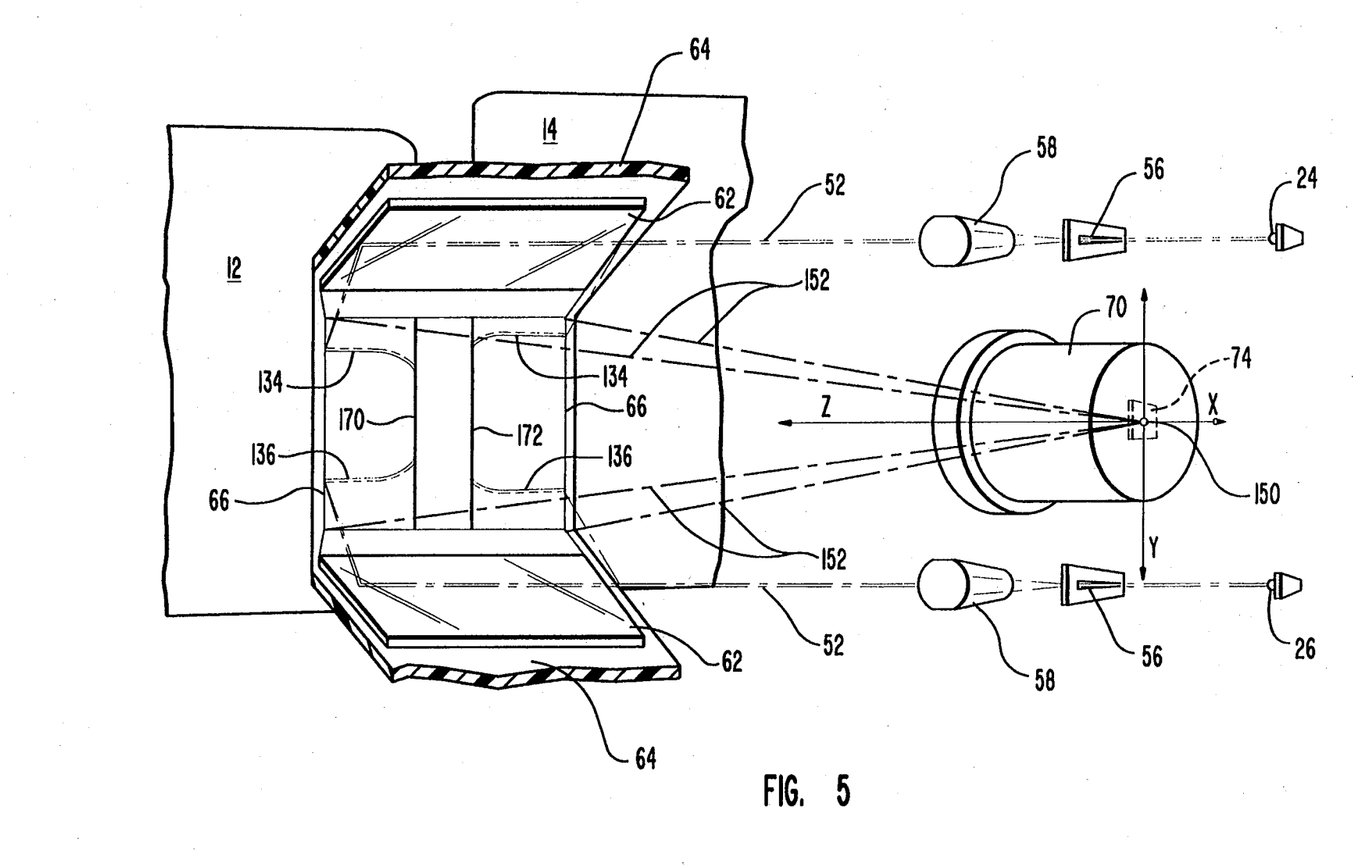
FIG. 5 is a perspective view of two adjacent surfaces being measured for gap and mismatch with portions of the housing of the device of the present broken away to more clearly illustrate the path of light planes and camera rays.

The device 10 of the present invention may be used to measure the gap and mismatch of two adjacent surfaces 12 and 14, as illustrated in FIG. 5. The present invention provides a quick and effective means for measuring gap and mismatch in virtually all lighting conditions.

Figure 4:
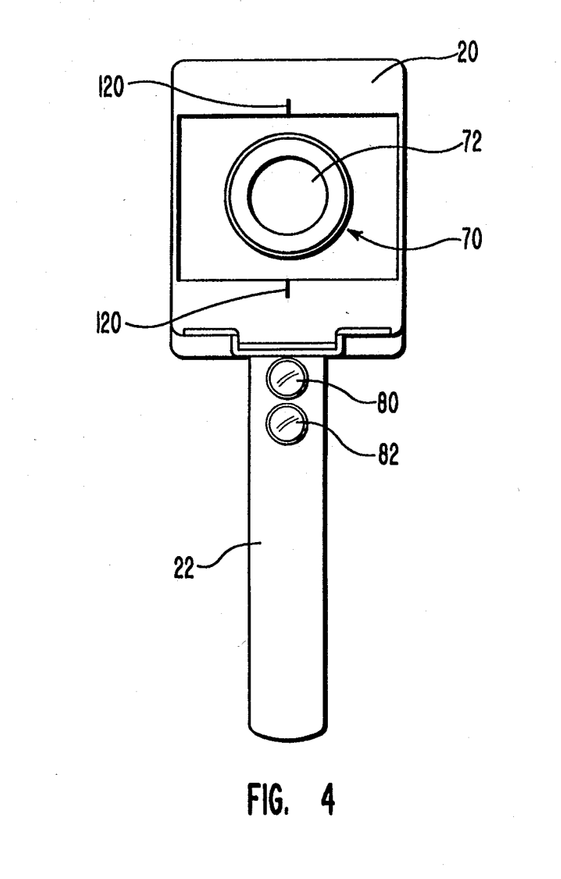
FIG. 4 is a plan view taken along line 4—4 of FIG. 2.

In operation, the measurement head 16 of the gap and mismatch device 10 of the present invention is placed against the border of the two adjoining surfaces 12 and 14 at the location where gap and mismatch is to be measured. The neck 62 of the measurement head 16 includes fiducial marks 120, as illustrated in FIG. 4, which aid the user in aligning the measurement head with the surfaces. Preferably, the opening 64 of the measurement head 16 is placed against the surfaces to be measured such that the fiducial marks 120 lie along the longitudinal direction of the gap, as illustrated in FIGS. 1 and 5.

However, because of the use of vector algebra to calculate gap and mismatch, as will be explained in greater detail below, the measurement head may be placed at an angle to the surfaces to be measured and still provide reliable data. In a presently preferred embodiment, it has been found that accurate data may be obtained from measurements taken with the measurement head 16 positioned at an angle up to about 10 degrees from a position normal to the surfaces being measured.

Once the READY light 88 illuminates, thereby signaling the user that the capacitors 28 are charged and that the computer is ready to receive data, the user may depress the measurement button 82 to take a measurement. Upon actuation of the measurement button 82, the capacitors 28 dump their charge to the strobe lights 24 and 26 and the two planes of light 52 and 54 are projected onto the surfaces 12 and 14, as illustrated in FIG. 5.

The planes of light 52 and 54 create two curvilinear images 134 and 136, respectively, on the surfaces. Each curvilinear image 134 and 136 includes a discontinuity at the location in the image where the image crosses the gap between the surfaces. The strobe lights 24 and 26 are synchronized with the camera 70 such that as the images are projected on the surfaces, the camera 70 records the images on the array 74.

The camera 70 is preferably positioned within the housing 20 such that the field of view of the camera 70 includes a substantial portion of the opening 64 of the housing 20, thereby ensuring that the images 134 and 136 lie within the field of view of the camera. The lens 72 of the camera is adjusted such that an image positioned contiguous to opening 64 of the housing 20 is focused on the array 74.

The camera image (the image in the field of view of the camera) is transmitted as a standard RS170 signal to the signal processor 18 via the cable 110 in line 112. At the signal processor 18, the frame grabber card digitizes and records the standard RS170 signal.

The first step in processing this signal is to set pixels that are less than a threshold value to zero and set the remaining pixels to a positive value, thus creating a binary image. An individual threshold value is determined for each column of the upper half of the image and for each column of the lower half of the image. An array of threshold values for columns spaced 20 apart is determined by identifying the smoothed maximum and minimum signal values produced by the camera in the column. A threshold value ($T_n$) is determined for each scanned column by the relation:

$$T_n = C_0 + C_1(\text{Max} - \text{Min}) + C_2(\text{Max} - \text{Min})^2$$

where $C_0$, $C_1$ and $C_2$ are experimentally determined. In a presently preferred embodiment, $C_0 = 16$, $C_1 = 0.1$ and $C_2 = 0.002$.

Threshold values for the columns lying between scanned columns are determined by linear interpolation of the threshold of the bounding columns. Of course, one of skill in the art will appreciate that there are a variety of methods by which suitable threshold values may be selected.

Digitizing and thresholding the signal from the camera produces a map of the inspected region of the curvilinear images 134 and 136. Thus, by analyzing the geometry of the curvilinear images 134 and 136, the amount of gap and mismatch can be ascertained, as is explained in greater detail below.

Once the image within the field of view of the camera 70 has been digitized and thresholded, the resulting two-dimensional image can be analyzed to determine gap and mismatch for the surfaces 12 and 14. Gap and mismatch are calculated by utilizing vector analysis of the two-dimensional image captured by the camera to determine the three-dimensional profile of the surfaces. This analysis utilizes an orthogonal coordinate system having its origin 150 at camera center, as illustrated in FIG. 5.

The calculations of gap and mismatch assume that all points in the curvilinear images 134 and 136 are a result of rays 152 emanating from the origin 150. By locating the intersection of the planes of light 52 and 54 with the camera rays 152, the three-dimensional location of a particular point on the camera image can be determined. This is done by simultaneously solving the parametric equation for the ray and the equation for the light plane which produced the point of interest.

For a calibrated system, the coefficients of the plane equations for the planes of light 52 and 54 are known with respect to the origin 150. The direction cosines are also known for a ray from the origin 150 to any point in the field of view of the camera. Thus, the only unknown is the length of the ray. The length of the ray is found by combining the ray equations with the equation of the light plane and solving for the length of the ray.

This concept may be depicted algebraically by expressing a ray which passes through the origin of an orthogonal coordinate system with three parametric equations:

$$x=ta \quad y=tb \quad z=tc$$

where t is the length and a, b and c are the direction cosines of the ray. When the camera is calibrated, a complete set of three direction cosines (a, b and c) for the ray emanating from the origin 150 can be determined for any location in the field of view of the camera.

A plane in space can be expressed by an equation in the form:

$$Ax+By+Cz=D.$$

If the coefficients are constrained so that $A^2+B^2+C^2=1$, then A, B and C are direction cosines for a vector normal to the plane. The distance from the plane to the origin 150 is $|D|$. Thus, to completely identify a point within the field of view of the camera, the ray equations are combined with the equation of the light plane as follows:

$$Aat+Bbt+Cct=D.$$

This equation is then solved for the length of the ray:

$$t=D/(Aa+Bb+Cc).$$

The ray length is then substituted into the parametric equations, yielding spatial values of x, y and z.

In order to accurately identify the three-dimensional position of points in the field of view of the camera, the system must first be calibrated. System calibration is accomplished by calibrating the camera such that the direction cosines are known for any point in the field of view and calibrating the signal processor such that the coefficients for the light plane equation are known with respect to camera center, i.e., "light plane" calibration.

Calibration of the camera is accomplished by utilizing a template configured with a series of vertical lines having known uniform spacing. The template is placed against the housing 20 at the opening 64. Thus, the z distance from the camera origin 150 to the template is known to be the distance from the camera origin 150 to the opening 64. The camera then records the image which appears on the template and transmits that image to the computer.

The pixel spacing of the lines as read by the computer may then be compared to the actual spacing, thereby permitting the number of pixels per inch to be calculated in the x direction. Predetermined knowledge of the pixel size ratio of the camera permits calculation of the number of y pixels per inch. The known z distance taken in combination with the calculated pixel-per-inch information in the x and y directions enables the camera to be calibrated. Any x-y pixel coordinate can then be transformed to a set of direction cosines of a camera ray 152 passing through that point. It is presently preferred that all coordinates along the three axes be expressed in a single unit, arbitrarily taken as y pixels.

A calibration plate is used in performing the light plane calibration. The calibration plate is a flat-surfaced metal plate having a slot of known depth cut into its center. The light plane calibration is performed by holding the calibration plate contiguous to housing 20 at the opening 64 such that the slot in the calibration plate is oriented in line with the fiducial marks 120. By positioning the calibration plate normal to the camera z-axis, the z distance from the camera origin 150 and the calibration plate is known.

By directing the light planes at the calibration plate, three line segments are recorded on the array for each light plane. Each line segment represents the intersection of the light plane to be calibrated with the calibration plate. For each light plane, two collinear segments appear on each side of the slot. A third segment, positioned between the other two segments, represents the intersection of the light plane with the bottom of the slot.

Three points are then located on the array: (1) the left endpoint of the left line segment; (2) the right endpoint of the right line segment; and (3) the midpoint of the center line segment. Points (1) and (2) are read directly from the image, while determining point (3) requires taking account for the greater z distance from the camera origin 150 to the calibration plate. This procedure identifies the location of three points in space which lie in the light plane. As one of ordinary skill in the art will appreciate, the light plane parameters may now be calculated using ordinary vector algebra. As with camera calibration, the units utilized in the light plane calibration are y-pixels.

Once the system has been calibrated, points within the field of view of the camera may be located. By identifying the three-dimensional position of several predetermined points within the field of view of the camera, gap and mismatch can be easily calculated utilizing simple principles of vector analysis.

Figure 6:
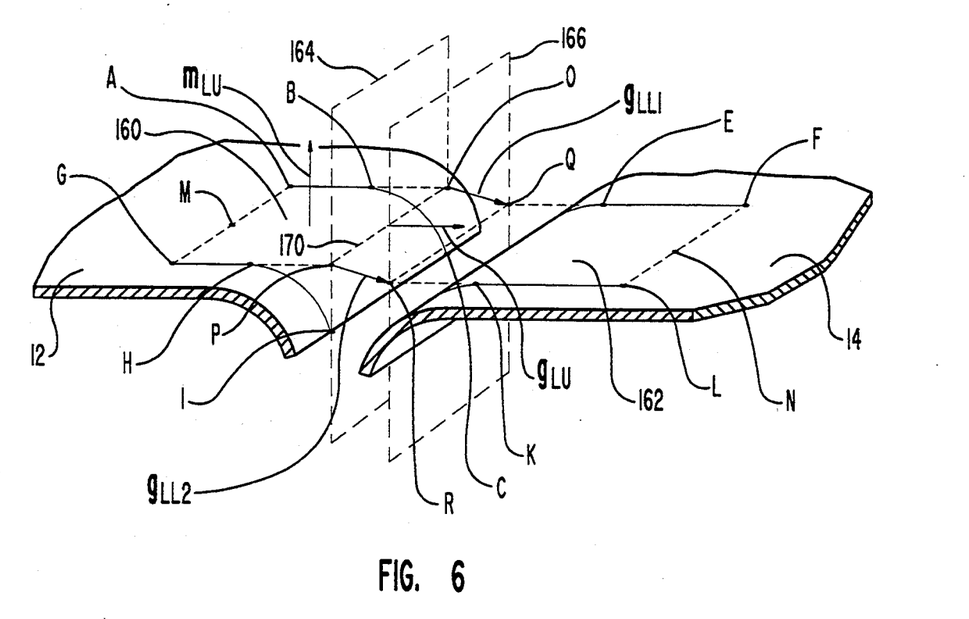
FIG. 6 is a perspective view of the surfaces illustrated in FIG. 5, illustrating points and planes which are located during the calculations of gap and mismatch.
Figure 7:
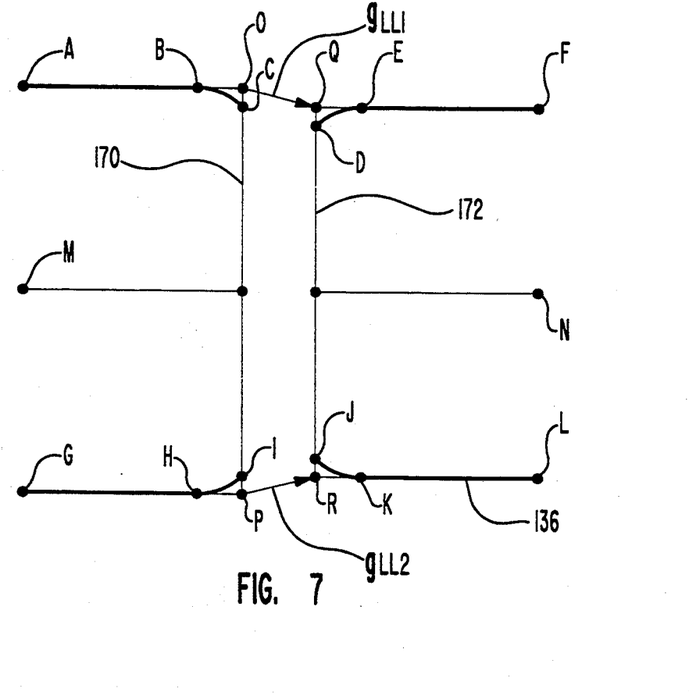
FIG. 7 is an illustration of the images generated on the surfaces of FIG. 5, with reference points used in the calculation of gap and mismatch indicated.

FIGS. 6 and 7 illustrate a typical camera image created by projecting the planes of light 52 and 54 on surfaces 12 and 14. For purposes of calculation, 12 points (A-L) are identified and located along the curvilinear images 134 and 136.

Points A, F, G and L represent the ends of the images 134 and 136 at the perimeter of the camera image (the field of view of the camera). Points B, E, H and K represent the last points that lie on a least squares, straight-line fit of the curvilinear images within a predetermined vertical tolerance band. Of course, one of skill in the art will appreciate that there are a variety of methods which could be used to locate points B, E, H and K.

A presently preferred method is to begin at the end of the image, such as at point A, and move 10 pixels towards the gap to locate a point of analysis which is then compared with point A. If the centerline of the image at the point of analysis is within the vertical tolerance band, preferably four pixels, then that point of analysis is included in the least squares, straight line fit and a new point of analysis, ten pixels closer to the gap, is selected and the analysis is repeated. When the point of analysis falls outside the tolerance band, it is presently preferred to move back 20 pixels and define that point as point B, E, H or K, as the case may be.

The next series of points on the curvilinear images to be determined are points C, D, I and J, which correspond to the "ends" of the curvilinear images 134 and 136 at the gap. Because of various geometries surrounding the gap, the image may not actually end. Thus, the "end" of the image is defined by tracking each image either to extinction or to a sharp change in direction. Initially, a coarse search is accomplished to determine the location of these points within a general range. A fine search is then conducted to identify with greater particularity the location of the points. The location as determined by the fine search is that which is utilized in conducting the gap and mismatch calculations.

The coarse search is conducted in a manner similar to that employed to identify points B, E, H and K; that is, a point of analysis is chosen 10 pixels in the horizontal direction from the outside edge of the curvilinear image and that point is analyzed to determine if it falls within the line center band of the image. In a presently preferred embodiment of the invention, a line center band of eight pixels is utilized in this analysis. If the point of analysis falls within the band, the least squares linear fit of the line is updated with that point and a new point of analysis, ten pixels closer to the gap, is selected and analyzed. Once a selected point of analysis fails the test, the last "good" pixel is chosen as the basis from which the fine search is begun.

Whereas the coarse search analyzed every ten horizontal pixels, the fine search is conducted on a column-by-column basis. In a presently preferred embodiment of the invention, each column of pixels is subjected to three different criteria for determining if it represents the "end" of that particular image. If it passes all three criteria, then the next column of pixels is selected and subjected to the same tests.

The first test of the fine search is merely whether there are any pixels in the column being analyzed, i.e., whether the image has disappeared. This test would typically be failed if the edge leading to the gap were extremely sharp. Thus, this test is passed by locating any pixels in the column.

The second test of the fine search analyzes the width of the line in the vertical direction, as illustrated in FIG. 7, and determines whether the vertical width of the line in the column in question has dropped below a minimum threshold width. If the width of the line is within the threshold width, the test is passed. It is presently preferred to utilize three pixels as the minimum threshold width. This could occur if the line is quickly coming to a point, but has not been entirely extinguished.

The third test of the fine search initially attempts to identify a window consisting of five contiguous columns of pixels. All the pixels within the columns defining that window are fit to a line utilizing a second order least squares fit. The pixels in the sixth column are then analyzed relative to the five previous columns. If the pixels in the sixth column pass the third test of the fine search, the sixth column is included within the window and the pixels from the first column are dropped, thereby maintaining a five column window. The second order, least squares fit is updated with the pixels of the new column and the test repeated.

Once the moving window has been established and fit to a line, as described above, the center of the line at the sixth column (the column contiguous to the window) is identified and compared with the center of the line defined by the second order fit of the moving window. If the center of the line at the sixth column is outside a tolerance band, the test is failed. A tolerance band of four pixels has been found to be preferred for use with this test. This condition could be present if there is a bottom in the gap which would result in a sharp change of direction of the line at that point.

If, however, the end of the image is within five pixels of the ending point of the coarse search, it will be impossible to establish a five pixel window. If a five pixel window cannot be established with which to conduct the third test of the fine search, as outlined above, then an alternate third test is employed.

The alternative third test is conducted by merely identifying the center of the line at the last known good column and comparing it with the center of the line at the next column. If those two points differ by an amount greater than the tolerance band, then the test is failed and it is assumed that the line ends at the last known good column. For this alternate third test, a tolerance band of four pixels is presently preferred.

Following the identification of points C, D, I and J, six artificial points, points M-R, are also located on the camera image. With continued reference to FIGS. 6 and 7, points M and N are defined as the midpoints between points A and G and points F and L, respectively. A left surface plane 160 can then be defined as the plane including points M, B and H. Similarly, a right surface plane 162 is then defined as the plane including points N, E and K. One of ordinary skill in the art will appreciate that a variety of points on the surfaces may be utilized in defining the plane.

With points C, D, I and J located, a left gap edge plane 164 is defined as the plane including points C and I which is orthogonal to left surface plane 160. Likewise, a right gap edge plane 166 is defined as the plane including points D and J which is orthogonal to right surface plane 162.

The intersection of the left gap edge plane 164 with the left surface plane 160 defines the left gap edge 170. The left gap edge 170 includes artificial points O and P, where point O is collinear with points A and B and point P is collinear with points G and H. Similarly, the intersection of the right gap edge plane 166 with the right surface plane 162 defines the right gap edge 172. Right gap edge 172 includes artificial points Q and R, where point Q is collinear with the image which includes points E and F and point R is collinear with the image which includes points K and L.

The direction of gap and mismatch from the left surface 12 is determined by defining unit vectors relative to the left surface plane 160. Thus, the direction of mismatch from the left surface 12 is defined by a left mismatch unit vector $m_{LU}$, normal to the left surface plane 160. Similarly, the direction of the gap from the left surface 12 is defined by a left gap unit vector $g_{LU}$, lying in the left surface plane 160, positioned normal to the left gap edge 170 and extending towards the right surface 14.

A left gap length vector, $g_{LL}$, is then defined as extending from line OP to line QR in a direction normal to line OP. While this length vector could be defined at a variety of points along line OP, it is presently preferred to define two length vectors $g_{LL1}$ and $g_{LL2}$ and use an average in the calculations for gap and mismatch. The first length vector $g_{LL1}$ extends from point O to point Q and the second length vector $g_{LL2}$ extends from point P to point R. The mismatch from the left gap edge 170 to the right gap edge 172 is then defined as the dot product of the left gap length vector $g_{LL}$ and the left mismatch unit vector $m_{LU}$, or $g_{LL} \cdot m_{LU}$, where $g_{LL}$ is the average of $g_{LL1}$ and $g_{LL2}$. Thus, the mismatch, as measured from the left surface 12, is merely the component, or projection, of $g_{LL}$ in the direction of $m_{LU}$.

The gap, as measured from the left surface 12, is then defined as the dot product of the left gap length vector $g_{LL}$ and the left gap unit vector $g_{LU}$, or $g_{LL} \cdot g_{LU}$. Thus, the gap, as measured from the left surface 12, is the component, or projection, of the left gap length vector $g_{LL}$ in the direction of the left gap unit vector $g_{LU}$.

Similar measurements may be made from the right surface 14. When making measurements from the right surface 14, the direction of mismatch is defined by a right mismatch unit vector $m_{RU}$ (not shown), normal to the right surface plane 162. The direction of the gap from the right surface 14 is defined by a right gap unit vector $g_{RU}$ (not shown), lying in the right surface plane 162, positioned normal to the right gap edge 172 and extending towards the left surface 12.

A right gap length vector, $g_{RL}$ (not shown), may be similarly defined from the midpoint of points Q and R to the midpoint of points O and P. The mismatch from the right gap edge 172 to the left gap edge 170 is thus dot product of the right gap length vector $g_{RL}$ and the right mismatch unit vector $m_{RU}$, or $g_{RL} \cdot m_{RU}$. The gap, as measured from the right surface 14, is the dot product of the right gap length vector $g_{RL}$ and the right gap unit vector $g_{RU}$, or $g_{RL} \cdot g_{RU}$.

In some circumstances it may be desirable to take "central point" measurements. Central point measurements may be easily obtained by averaging readings taken from the left and the right surfaces. Central point measurements are generally most relevant when seeking to maximize the aesthetic appeal of the fit between two adjacent surfaces.

Figure 8:
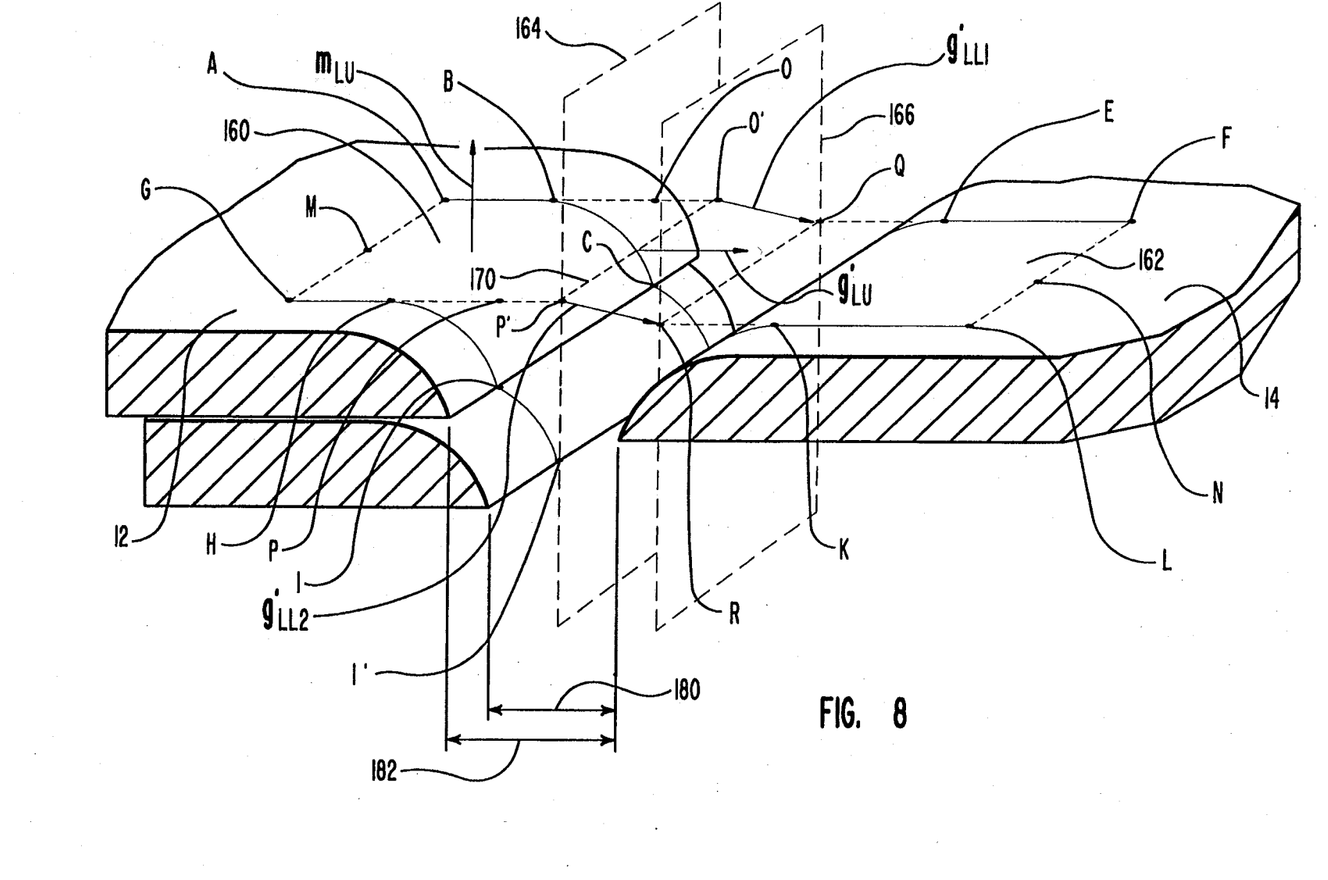
FIG. 8 is a perspective view of two adjacent surfaces having an inside and an outside gap, illustrating points and planes which are located during the calculations of gap and mismatch.

In some applications, one surface, or panel, may have two points which could be construed as the end point of the surface. Such a situation could arise when the surface is made of a laminated material. As illustrated in FIG. 8, the surfaces would then include an inside gap 180 and an outside gap 182.

Figure 9:
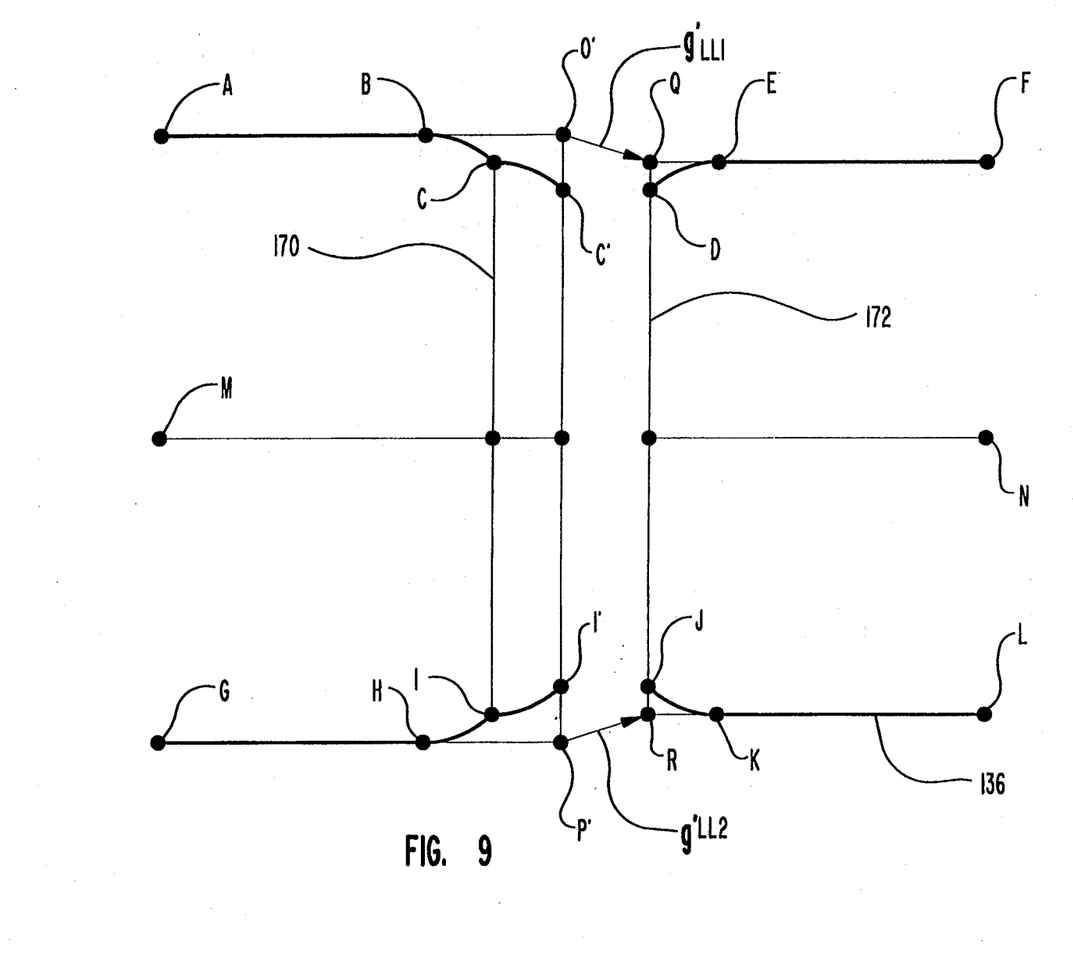
FIG. 9 is an illustration of the images generated on the surfaces of FIG. 8, with reference points used in the calculation of gap and mismatch indicated.

When dealing with surfaces having an inside and an outside gap, the user may utilize the device of the present invention to measure gap and mismatch with respect to either gap. This is done by pressing the "MODE" button 94 (FIG. 3) until the appropriate mode is displayed on the display 84. The up and down arrows 96 and 98 may then be utilized to select either the inside gap or the outside gap. If the outside gap 182 is selected, measurement proceeds as described above. As illustrated in FIGS. 8 and 9, the abrupt change in direction of the images at points C and I will be interpreted by the fine search as the end of each image and the calculations of gap and mismatch will proceed with points C and I assumed to be the ends of the images at the gap.

If the inside gap 180 is selected, however, then upon identifying points C and I in the fine search, the search will continue until one of the three tests which comprise the fine search is again failed. As illustrated in FIG. 9, the identification of the ends of the images in the second fine search will identify points C' and I'. The calculation of gap and mismatch then proceeds substantially as set forth above in connection with FIGS. 6 and 7, but using points C' and I' instead of points C and I, as the ends of the surface at the gap.

The left gap length vector $g'_{LL1}$ is then defined as extending from point O' to point Q and length vector $g'_{LL2}$ is defined as extending from point P' to point R. The left gap unit vector $g_{LU}$ and the left mismatch unit vector $m_{LU}$ are defined relative to the left surface plane 160, as described above. The inside gap is then the dot product of the left gap length vector $g_{LL}$ and the left gap unit vector $g_{LU}$, or $g_{LL} \cdot g_{LU}$, where $g_{LL}$ is the average of $g'_{LL1}$ and $g'_{LL2}$. Similarly, the mismatch is the dot product of the left gap length vector $g_{LL}$ and the left mismatch unit vector $m_{LU}$, or $g_{LL} \cdot m_{LU}$.

The use of vector algebra to calculate gap and mismatch enables the system to work under a variety of conditions. Advantageously, the present invention has successfully measured gap and mismatch on curved surfaces having a diameter greater than about 20 inches.

The identification of the three-dimensional position of points A through R and the performance of the vector analysis outlined above to measure gap and mismatch are all performed by the signal processor 18. As one of ordinary skill in the art will appreciate, there are a variety of ways to program a computer to perform these calculations.

Once calculated, the gap and mismatch data is transmitted by the signal processor 18 through the RS232 cable in line 112 (FIG. 2) back to the measurement head 16 where the data is displayed on display 84 (FIG. 3). Additionally, the information is stored in data files in the computer thereby allowing a permanent record of the data to be maintained.

The device 10 of the present invention is particularly advantageous for use in identifying whether the gap and mismatch of two adjacent surfaces fall within predetermined tolerances. For example, an assembly line may include a measurement station where a variety of different locations on adjacent panels are tested for gap and mismatch to determine whether the fit of those panels is in conformance with predetermined tolerances.

For such an application, the present invention is advantageously configured such that tolerances for gap and mismatch for each location to be tested may be entered into the system. When a measurement is taken of the first location, the gap and mismatch is calculated as described above and displayed to the user on the display 84, as illustrated in FIG. 3. The signal processor will then compare the computed values for gap and mismatch against the previously input tolerance levels for that particular location. If the measurements are not within tolerance, the yellow OUT OF TOLERANCE light 90 will illuminate, thereby signaling to the user that the adjacent panels have failed the test at that location.

If the user suspects that the measurement was inaccurate or otherwise desires to remeasure gap and mismatch at the same location, subsequent measurements may be taken until the user is satisfied that the data being returned is accurate. The user may then depress the advance button 80 (FIG. 2) to indicate to the signal processor 18 that measurements will now be taken of the next, pre-programmed location.

If, while taking a measurement, the signal processor is unable to compute a value for gap or mismatch, due to any of a variety of factors which may cause a poor reading during measurement, the red REMEASURE light 92 will illuminate, indicating to the user that it is necessary to take another measurement to obtain a reading for gap and mismatch.

Although the device is explained for use with a particular application, one of skill in the art will appreciate that the device of the present invention may be programmed to accommodate a variety of applications.

From the foregoing, it will be appreciated that the present invention provides an improved apparatus and process for measuring gap and mismatch which provides increased accuracy over existing manual methods, thereby enabling tighter tolerances to be achieved in the fitting of body panels and other applications. The present invention also provides an apparatus and process for measuring gap and mismatch which automatically records data, thereby eliminating the possibility of human error in the recordation of data.

Indeed, the apparatus and process of the present invention may be utilized to quickly measure gap and mismatch at a variety of locations, thereby rendering quantitative inspections of body panels economically viable and enabling superior fit of body panels to be achieved.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for ascertaining information relating to the spatial relationship of two adjacent surfaces, comprising:
   a light source;
   an optical interface configured to receive light from the light source and to project a first plane of light onto the surfaces at a first non-normal angle of incidence to create a first curvilinear image and a second plane of light onto the surfaces at a second non-normal angle of incidence to create a second curvilinear image;
   a camera including an area array of detectors, each detector capable of detecting intensity of light and of generating a signal corresponding to the detected intensity, the camera positioned such that the images of the planes of light projected onto the surfaces are within the field of view of the camera; and
   a signal processor in communication with the camera for processing the signal generated by the camera.

2. An apparatus for ascertaining information relating to the spatial relationship of two adjacent surfaces as described in claim 1, wherein the optical interface includes long-focus cylindrical lenses for receiving light from the light source and for projecting the planes of light within planes having known position.

3. An apparatus for ascertaining information relating to the spatial relationship of two adjacent surfaces as described in claim 1, wherein the optical interface includes mirrors positioned to project the planes of light onto the surfaces at an angle of incidence in the range from about 40 to about 50 degrees.

4. An apparatus for ascertaining information relating to the spatial relationship of two adjacent surfaces as described in claim 1, wherein the camera includes a lens configured to focus the first and second curvilinear images onto the array of detectors.

5. An apparatus for measuring the gap and mismatch of two adjacent surfaces, comprising:
   at least one light source;
   an optical interface positioned to receive light emitted by the light source, the optical interface comprising:
      means, in combination with the light source, for directing a portion of the light to generate a first and a second plane of light;
      first means for projecting the first plane of light onto the surfaces at a first non-normal angle of incidence such that a first curvilinear image is produced on the surfaces; and
      second means for projecting the second plane of light onto the surfaces at a second non-normal angle of incidence such that a second curvilinear image is produced on the surfaces;
   a camera including an area array of detectors, each detector capable of detecting intensity of light and of generating a signal corresponding to the detected intensity, the camera also including a lens configured to focus an image onto the array of detectors, the camera positioned such that the first and second curvilinear images projected onto the surfaces are within the field of view of the camera; and
   a signal processor in communication with the camera for processing the signal generated by the array of detectors.

6. An apparatus for measuring the gap and mismatch of two adjacent surfaces as defined in claim 5, wherein the light source comprises first and second strobe lights.

7. An apparatus for measuring the gap and mismatch of two adjacent surfaces as defined in claim 5, wherein the first and second non-normal angles of incidence are equal in magnitude and opposite in direction.

8. An apparatus for measuring the gap and mismatch of two adjacent surfaces as defined in claim 7, wherein the non-normal angles of incidence are about 45 degrees.

9. An apparatus for measuring the gap and mismatch of two adjacent surfaces as defined in claim 5, wherein the directing means comprises a long-focus cylindrical lens and an aperture collinearly positioned with the cylindrical lens.

10. An apparatus for measuring the gap and mismatch of two adjacent surfaces as defined in claim 5, further comprising positioning means for positioning the directed portion of light such that the curvilinear images produced on the surfaces are substantially perpendicular to the longitudinal direction of the gap between the surfaces.

11. An apparatus for measuring the gap and mismatch of two adjacent surfaces as defined in claim 10, further comprising a housing within which the light source, the optical interface and the camera are positioned and wherein said positioning means comprises fiducial marks configured on the housing.

12. A hand-held apparatus for measuring the gap and mismatch of two adjacent surfaces, comprising:
   a housing having an opening, the opening defining a plane;
   a first and second light source positioned within the housing and disposed in a substantially parallel relationship;
   an optical interface, comprising:
      first and second apertured lenses, the first apertured lens disposed within the housing to receive light emitted from the first light source, the second apertured lens disposed within the housing to receive light emitted from the second light source, the apertured lenses configured to direct a portion of the light generated by each light source into substantially parallel planes to generate a first and a second plane of light;

a first mirror disposed within the housing and positioned to reflect the first plane of light from the first light source out of the opening of the housing at a first angle in the range from about 40 to about 50 degrees with respect to the plane of the opening to create a first curvilinear image on the surfaces; and a second mirror disposed within the housing and positioned to reflect the second plane of light from the second light source out of the opening of the housing at a second angle in the range from about 40 to about 50 degrees with respect to the plane of the opening to create a second curvilinear image on the surfaces, the first and second mirrors positioned with respect to each other such that the plane of light reflected from the first mirror converges towards the plane of light reflected from the second mirror such that the line of intersection of the two planes is substantially parallel to the plane of the opening of the housing;

a camera including an area array of detectors, each detector capable of detecting intensity of light and of generating a signal corresponding to the detected intensity, the camera also including a lens configured to focus an image onto the array of detectors, the camera positioned within the housing and directed towards the opening of the housing such that the field of view of the camera includes substantially all of the opening of the housing; and a signal processor in communication with the camera for processing the signal generated by the array of detectors.

13. A hand-held apparatus for measuring the gap and mismatch of two adjacent surfaces as defined in claim 12, wherein the first and second light source comprise strobe lights.

14. A hand-held apparatus for measuring the gap and mismatch of two adjacent surfaces as defined in claim 12, wherein the first and second apertured lenses comprise long focus cylindrical lenses, the optical interface further comprising an aperture collinearly positioned with each cylindrical lens.

15. A hand-held apparatus for measuring the gap and mismatch of two adjacent surfaces as defined in claim 12, wherein the first and the second angles are about 45 degrees.

16. An apparatus for measuring the gap and mismatch of two adjacent surfaces as defined in claim 12, further comprising fiducial marks configured on the housing adjacent the opening of the housing for positioning the directed portion of light such that the curvilinear images produced on the surfaces are substantially perpendicular to the longitudinal direction of the gap between the surfaces.

17. An apparatus for measuring the gap and mismatch of two adjacent surfaces as defined in claim 12, wherein the signal processor comprises a computer which includes a frame grabber card.

18. A method for measuring the gap and mismatch of two adjacent, generally coplanar surfaces separated by a gap, comprising the steps of:

directing two non-parallel planes of light towards the surfaces at non-normal angles of incidence to the surfaces to thereby project two curvilinear images on the surfaces such that the curvilinear images each intersect the gap between the surfaces, thereby producing a discontinuity in the images at the gap;

capturing a two-dimensional image of the curvilinear images on the surfaces; and analyzing the captured curvilinear images to determine data concerning the size of the gap and the amount of the mismatch of the surfaces.

19. A method for ascertaining information concerning the spatial relationship of two adjacent surfaces as defined in claim 18, wherein the analyzing step is preceded by capturing the images on the surfaces with a camera.

20. A method for measuring the gap and mismatch of two adjacent, generally coplanar surfaces separated by a gap, as defined in claim 18, wherein the step of directing two non-parallel planes of light towards the surfaces is preceded by generating two beams of light by causing two strobe lights to flash and directing the generated beams of light into planes.

21. A method for measuring the gap and mismatch of two adjacent, generally coplanar surfaces separated by a gap, as defined in claim 18, wherein the step of directing two non-parallel planes of light towards the surfaces comprises directing the non-parallel planes of light towards the surfaces such that the curvilinear images which are projected on the surfaces are substantially perpendicular to the longitudinal direction of the gap between the surfaces.

22. A method for measuring the gap and mismatch of two adjacent, generally coplanar surfaces separated by a gap, as defined in claim 18, wherein the capturing step comprises projecting the curvilinear images on an area array of detectors capable of detecting intensity of light and of generating a signal corresponding to the detected intensity.

23. A method for measuring the gap and mismatch of two adjacent, generally coplanar surfaces separated by a gap, as defined in claim 18, wherein the step of directing two non-parallel planes of light towards the surfaces includes directing the planes of light towards the surfaces at an angle of incidence in the range from about 40 to about 50 degrees.

24. A method for measuring the gap and mismatch of two adjacent, generally coplanar surfaces separated by a gap, as defined in claim 18, wherein the angle of incidence of the two non-parallel planes to the surfaces is approximately 45 degrees.

25. A method for measuring the gap and mismatch of two adjacent, generally coplanar surfaces separated by a gap, as defined in claim 18, wherein the analyzing step comprises:

identifying the three-dimensional position of the plane corresponding to the surface from which gap and mismatch is to be measured; and identifying the three-dimensional location of the edge of each surface at the gap.

26. A method for measuring the gap and mismatch of two adjacent, generally coplanar surfaces separated by a gap, as defined in claim 25, wherein the analyzing step further comprises:

defining a mismatch unit vector perpendicular to a predetermined surface;

defining a gap unit vector lying in the plane of the predetermined surface and positioned normal to the gap edge of the predetermined surface;

defining a gap length vector extending from the gap edge of the predetermined surface to a corresponding position on the gap edge of the opposite surface;

calculating the dot product of the mismatch unit vector with the gap length vector to ascertain the magnitude of mismatch; and calculating the dot product of the gap unit vector with the gap length vector to ascertain the magnitude of the gap.

27. A method for measuring the gap and mismatch of two adjacent, generally coplanar surfaces separated by a gap, as defined in claim 18, wherein the step of analyzing the captured images is followed by recording the determined data.

28. A method for measuring the gap and mismatch of two adjacent, generally coplanar surfaces separated by a gap, as defined in claim 18, wherein the step of analyzing the captured images is followed by displaying the data.

29. A method for measuring the gap and mismatch of two adjacent, generally coplanar surfaces separated by a gap, as defined in claim 18, wherein the step of analyzing the captured images is followed by ascertaining whether the data falls within a predetermined range of values.

30. A method for measuring the gap and mismatch of two adjacent, generally coplanar surfaces separated by a gap, comprising the steps of:

directing a first beam of light through a first apertured lens to form a first plane of light;

directing a second beam of light through a second apertured lens to form a second plane of light which is substantially parallel to the first plane of light;

directing two non-parallel planes of light towards the surfaces, comprising:
  reflecting the first plane of light onto the surfaces at an incident angle in the range from about 40 to about 50 degrees with respect to the surfaces to form a first curvilinear image which intersects the gap between the surfaces, is substantially perpendicular to the longitudinal direction of the gap and has a discontinuity at the gap and
  reflecting the second plane of light onto the surfaces at an incident angle equal and opposite to that of the incident angle of the first plane of light to form a second curvilinear image which intersects the gap between the surfaces, is substantially perpendicular to the longitudinal direction of the gap and has a discontinuity at the gap;

capturing the first and second curvilinear images on an area array of detectors capable of detecting intensity of light and of generating a signal corresponding to the detected intensity; and analyzing the signal generated by the array of detectors to determine data concerning the size of the gap and amount of mismatch of the surfaces.

31. A method for measuring the gap and mismatch of two adjacent, generally coplanar surfaces separated by a gap, as defined in claim 30, wherein the step of directing two non-parallel planes of light towards the surfaces is preceded by generating two beams of light by causing two strobe lights to flash and directing the generated beams of light into planes.

32. A method for measuring the gap and mismatch of two adjacent, generally coplanar surfaces separated by a gap, as defined in claim 30, wherein the angle of incidence of the two non-parallel planes to the surfaces is approximately 45 degrees.

33. A method for measuring the gap and mismatch of two adjacent, generally coplanar surfaces separated by a gap, as defined in claim 30, wherein the analyzing step comprises:

identifying the three-dimensional position of the plane corresponding to the surface from which gap and mismatch is to be measured; and identifying the three-dimensional location of the edge of each surface at the gap.

34. A method for measuring the gap and mismatch of two adjacent, generally coplanar surfaces separated by a gap, as defined in claim 33, wherein the analyzing step further comprises:

defining a mismatch unit vector perpendicular to a predetermined surface;

defining a gap unit vector lying in the plane of the predetermined surface and positioned normal to the gap edge of the predetermined surface;

defining a gap length vector extending from the gap edge of the predetermined surface to a corresponding position on the gap edge of the opposite surface;

calculating the dot product of the mismatch unit vector with the gap length vector to ascertain the magnitude of mismatch; and calculating the dot product of the gap unit vector with the gap length vector to ascertain the magnitude of the gap.

35. A method for measuring the gap and mismatch of two adjacent, generally coplanar surfaces separated by a gap, as defined in claim 34, wherein the step of analyzing the captured images is followed by displaying and recording the determined data.

36. A method for measuring the gap and mismatch of two adjacent, generally coplanar surfaces separated by a gap, as defined in claim 34, wherein the step of analyzing the captured images is followed by ascertaining whether the data falls within a predetermined range of values.

* * * * *